(12) United States Patent
Mannby

(10) Patent No.: US 11,301,674 B2
(45) Date of Patent: Apr. 12, 2022

(54) STROKE ATTRIBUTE MATRICES

(71) Applicant: Microsoft Technology Licensing, LLC, Redmond, WA (US)

(72) Inventor: Claes-Fredrik U. Mannby, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 142 days.

(21) Appl. No.: 16/744,654

(22) Filed: Jan. 16, 2020

(65) Prior Publication Data
US 2021/0224528 A1 Jul. 22, 2021

(51) Int. Cl.
| | | |
|---|---|---|
| *G06K 9/00* | (2006.01) | |
| *G06F 3/04883* | (2022.01) | |
| *G06F 17/16* | (2006.01) | |
| *G06K 9/46* | (2006.01) | |

(52) U.S. Cl.
CPC ..... *G06K 9/00416* (2013.01); *G06F 3/04883* (2013.01); *G06F 17/16* (2013.01); *G06K 9/00436* (2013.01); *G06K 9/4604* (2013.01)

(58) Field of Classification Search
CPC .......... G06K 9/00416; G06K 9/00436; G06K 9/4604; G06F 3/04883; G06F 17/16
See application file for complete search history.

(56) References Cited

U.S. PATENT DOCUMENTS 5,982,387 A * 11/1999 Hellmann ............... G06K 15/02
345/467
2015/0253851 A1* 9/2015 Oh ...................... G06F 3/04883
345/179

OTHER PUBLICATIONS

Degtyarenko, et al., "Text/shape classifier for mobile applications with handwriting input", In the International Journal on Document Analysis and Recognition, vol. 19, Issue 4, Oct. 20, 2016, pp. 369-379.
Kim, et al., "On-line recognition of Korean characters using ART neural network and hidden Markov model", In the Journal of systems architecture, vol. 44, Issue.12, Sep. 1, 1998, pp. 971-984.
"International Search Report and Written Opinion Issued in PCT Application No. PCT/US20/064977", dated Mar. 22, 2021, 12 Pages.

* cited by examiner

*Primary Examiner* — Fayyaz Alam
(74) *Attorney, Agent, or Firm* — Fiala & Weaver P.L.L.C.

(57) ABSTRACT

Methods, systems, and computer program products are provided for stroke attribute matrices. User input strokes may be converted into attributes encoded in one or more stroke attribute matrices (SAMs), such as bitmaps, for image or other multidimensional analysis. One or more convolutional neural networks (CNNs) may recognize letters, symbols, shapes and gestures in SAMs. A selector may select output classifications from among multiple CNNs. A sequence analyzer may select a sequence of selected CNN outputs. Stroke information may comprise, for example, velocity (e.g. direction and speed), tilt, pressure, line width, pen up/down events, hover height, etc. Stroke information may be stored, for example, in bitmap color channels (e.g. to facilitate human review). For example, an x, y velocity vector and x, y tilt may be encoded, respectively, as RGBA components of pixel data. Stroke crossings may be encoded, for example, by combining attribute values at pixels where strokes intersect.

20 Claims, 7 Drawing Sheets

STROKE ATTRIBUTE MATRICES

BACKGROUND

Computing devices may capture user writing, drawing and gesturing as strokes. Strokes may be created by a finger or stylus pen applied to a capturing surface (e.g. a touchscreen computer display). Strokes may be stored in different forms (e.g. as images without information about strokes or as stroke data), which may impact an analysis to determine a user's intended meaning of strokes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for stroke attribute matrices. User input strokes may be converted into attributes encoded in one or more stroke attribute matrices (SAMs), such as bitmaps, for image or other multidimensional analysis. One or more convolutional neural networks (CNNs) may recognize letters, symbols, shapes and gestures in SAMs. A selector may select output classifications from among multiple CNNs. A sequence analyzer may select a sequence of selected CNN outputs. Stroke information may comprise, for example, velocity (e.g. direction and speed), tilt, pressure, line width, pen up/down events, hover height, etc. Stroke information may be stored, for example, in bitmap color channels (e.g. to facilitate human review). For example, an x, y velocity vector and x, y tilt may be encoded, respectively, as RGBA components of pixel data. Stroke crossings may be encoded, for example, by combining attribute values at pixels where strokes intersect.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
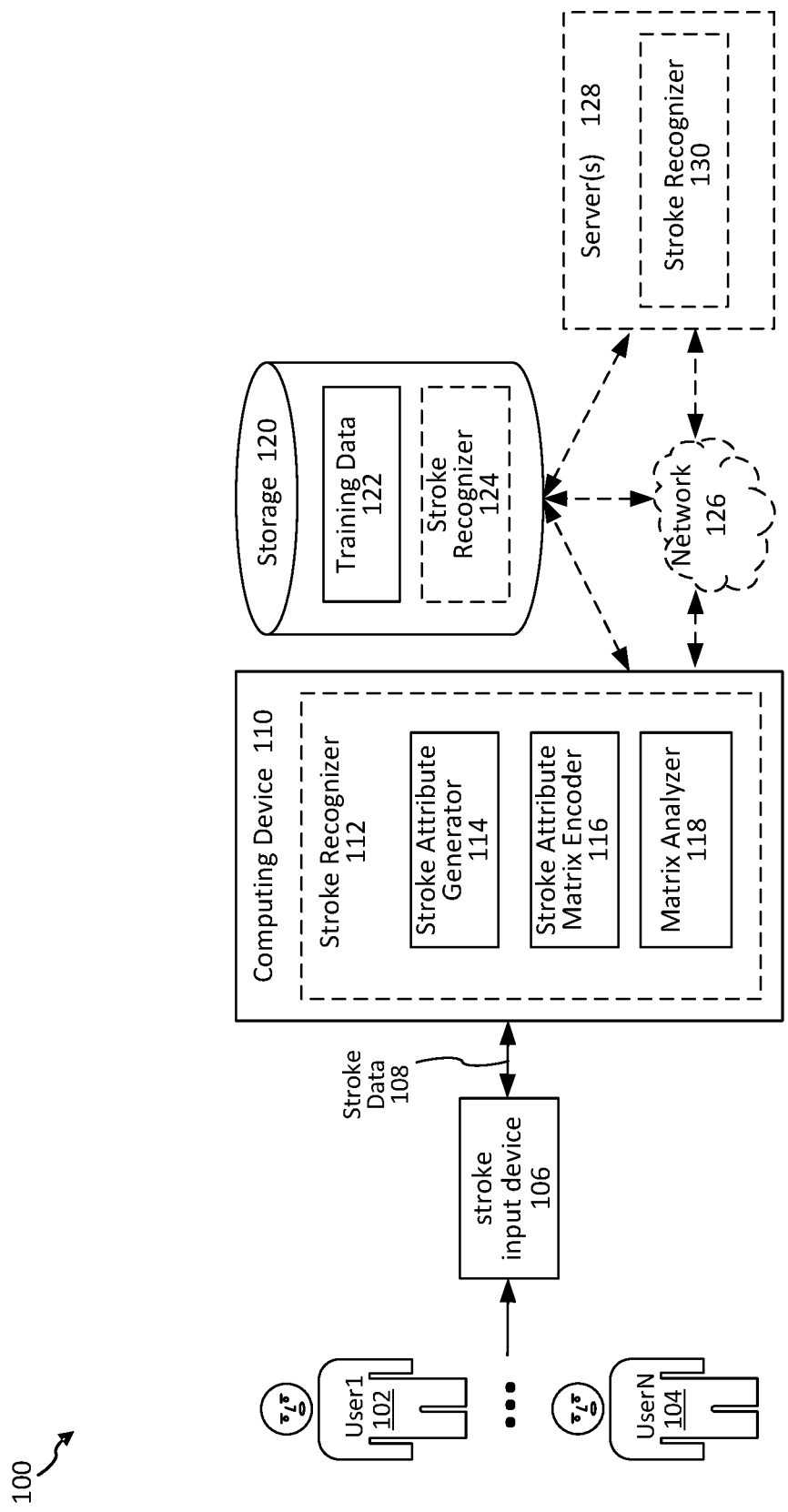
FIG. 1 shows a block diagram of a stroke attribute matrix system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Stroke analysis may be based on analyses of portions of images (e.g. bitmaps) of handwriting. An analysis may be oblivious to stroke information, such as the order of generation or temporal information. Stroke analysis may (e.g. alternatively) be based on stroke information. Stroke information may be divided, without context of other strokes. Without absolute position information for divided portions of stroke information, it may be unknown, for example, whether curve vectors close to make an "o" or stay open to make a "u," or whether a first portion of a stroke (e.g. a horizontal segment) intersects a second portion of a stroke (e.g. a vertical segment).

Convolutional neural networks (CNNs) may be used for image processing. Images, which may be in bitmap format, may be evaluated by CNNs (e.g. for image classification). Bitmaps may not capture all information (e.g. depending on what the image captures). For example, an image may not capture all information for a set of handwriting strokes. Stroke information captured for a stroke contains more data than an image of the stroke. Sequential analysis of stroke information may lose absolute position information (e.g. indicating whether stroke segments touch). In addition, some strokes (e.g. dots, dashes, corrections) may occur out of sequence.

Methods, systems, and computer program products are provided for stroke attribute matrices. Strokes may be converted into one or more matrices (e.g. bitmaps) for analysis and recognition. Stroke information (e.g. attributes, metadata) may be encoded in stroke attribute matrices (SAMs) for image or other multidimensional analysis. One or more (e.g. trained) convolutional neural networks (CNNs) may (e.g. operate in parallel to) recognize letters, symbols, shapes and gestures in SAMs. A selector may select output classifications from among multiple CNNs. A sequence analyzer may select a sequence of selected CNN outputs. Stroke information may comprise, for example, velocity (e.g. with direction and speed components), tilt (e.g. x and y tilt), pressure, line width, pen up/down events, hover height, etc. Stroke information may be stored, for example, in bitmap color channels (e.g. to facilitate human review). Stroke attributes may be encoded in bitmap channels (e.g. RGBA). Encoded stroke attributes may have positive and/or negative values within a range (e.g. in an 8-bit value range such as 0 to 255, −128 to 127, −127 to 128). For example, an x, y velocity vector may be encoded as red, green and an x, y tilt may be encoded as blue, alpha components of pixel data. Stroke crossings may be encoded, for example, by combining channel data at pixels where strokes intersect (e.g. by adding and clamping the sum to a valid range).

FIG. 1 shows a block diagram of a stroke attribute matrix system, according to an example embodiment. As shown in FIG. 1, system 100 may include a stroke input device 106, a computing device 110, one or more server(s) 128, and storage 120, which may be communicatively coupled, for example, by network 126. Computing device 110 may comprise a stroke recognizer application 112. A stroke recognizer application, or any part of it, may (e.g. additionally or alternatively) be located on server(s) 128 (e.g. stroke recognizer 130) and/or storage 120 (e.g. stroke recognizer 124). For example, computing devices may provide stroke data 108 to server(s) 128 for stroke recognition processing. FIG. 1 presents several of many computing environments that may implement subject matter described herein. As indicated by dashed lines, in various implementations, network 126 and/or server(s) 128 may or may not be part of a stroke attribute matrix system, which may, for example, impact the location of stroke recognizer 112, or a portion thereof, and storage 120.

Computing device 110 may comprise any computing device. Computing device 110 may be, for example, any type of stationary or mobile, wired or wireless, computing device, such as a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 110 may comprise one or more applications, operating systems, virtual machines, storage devices, etc. that may be executed, hosted, and/or stored therein or via one or more other (e.g., networked) computing devices. In an example, computing device 110 may access one or more server computing devices (e.g., over a network). An example computing device with example features is presented in FIG. 9, which is described in detail below.

Computing device 110 may share a communication interface with stroke input device 106. In an example, computing device 110 and stroke input device 106 may be integrated, for example, in a touch screen computing device (e.g., tablet or cellular phone). Computing device 110 may receive stroke data 108 from stroke input device 106. Computing device 110 and stroke input device 106 may be implemented at any (e.g., fixed or mobile) location for any purpose, such as, for example, any business, school, hospital, government entity, residence, etc.

Computing device 110 may execute one or more applications, such as stroke recognizer 112. In an example, stroke recognizer 112 may be provided by or accessed via server(s) 128, e.g., as a web application implemented within a browser application window on computing device 110. Stroke recognizer 112 may be configured to communicate with one or more input devices (e.g., stroke input device 106). Stroke input device 106 may receive and sample stroke input provided by user1 102 to userN 104. In an example, stroke recognizer 112 may be integrated with or may control stroke input device 106 to display to a user, for example, messages, prompts and/or feedback (e.g. display strokes as user provides them). Stroke recognizer 112 may receive sampled stroke input (e.g. stroke data 108) from stroke input device 106.

Storage 120 may comprise one or more storage devices, which may be local and/or remote (e.g., accessed via network 126). Storage 120 may comprise, for example, internal or external storage for computing device 110, internal or external storage for server(s) 128, network storage, etc. Storage 120 may store user information (e.g., authorized user data), training data 122, stroke recognizer 124, etc. In an example, storage 120 may store training data for multiple (e.g., tens, hundreds, thousands, millions, tens of millions of) users, which may be accessed, for example, by one or more stroke recognizers (e.g. stroke recognizer 112 and/or 130).

Network 126 may include, for example, any of a local area network (LAN), a wide area network (WAN), a personal area network (PAN), a combination of communication networks, such as the Internet, and/or a virtual network. In example implementations, computing device 110 and server (s) 128 may be communicatively coupled via network 126. Server(s) 1282 and computing device 110 may each include at least one network interface that enables communications over network 126. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described below.

Server(s) 128 may comprise one or more servers, such as one or more application servers, database servers, authentication servers, etc. Server(s) 128 may support interaction with computing device 110 and storage 120. Server(s) 128 may serve data (e.g., training data 122) and/or programs (e.g., stroke recognizer 112/124/130) to computing device 110. Server(s) 128 may, for example, provide application programming interfaces (APIs) for stroke recognizer 112 to interact with storage 120. Server(s) 128 may manage storing, processing, securing and retrieving data in storage 120. Server(s) 128 may comprise, for example, a database engine or management system (DBMS), such as when storage 120 comprises a database. An example of a database server is Microsoft Azure SQL Server.

Server(s) 128 may, for example, provide a cloud stroke recognition service. Server(s) 128 may provide stroke recognition services for multiple (e.g., tens, hundreds, thousands, millions of) entities with multiple (e.g., tens, hundreds, thousands, millions of) stroke input devices 106 for multiple (e.g., tens, hundreds, thousands, millions of) users. In an example, server(s) 128 may execute stroke recognizer 112 and/or any part thereof (e.g. matrix analyzer 118). Server(s) 128 may, for example, receive stroke data 108 (or output from stroke attribute generator 114, stroke attribute matrix encoder 116 or matrix analyzer 118) from computing device 110 (e.g., via network 126).

Users, such as user1 102 through userN 104, may interact with all or a portion of example system 100. In various implementations, there may be one or more (e.g., tens, hundreds, thousands, millions of) users who provide stroke input via one or more (e.g., tens, hundreds, thousands, millions of) stroke input devices (e.g. stroke input device 106). In various examples, users may indicate strokes to stroke input devices by using their hands, fingers, wired or wireless styluses, wands, gloves, rings, light or laser pointers, etc. Strokes may include text, symbols, shapes, gestures, etc.

Stroke input devices (e.g. stroke input device 106) detect user strokes. Stroke input device 106 may comprise hardware, firmware and/or software configured to detect strokes and generate stroke data 108. Stroke input devices may include, for example, touchscreen devices, motion detection devices, signal tracking devices or other devices capable of detecting strokes. In an example, a touchscreen tablet computer may detect user strokes by fingers and stylus. In an example, user strokes on a whiteboard or in air may be detected by a motion detection or tracking system. Stroke input device 106 may comprise a graphical user interface (GUI), which may be provided by an operating system (OS) or application. A GUI may provide feedback of stroking and/or recognition output to user1 102 (e.g. by displaying user input on a display). Stroke input device 106 may comprise one or more cameras and/or inertial measurement units that track fingers, stylus(es), wand(s) or other wrist, hand, or finger held or mounted units in space.

Stroke input device 106 may sample strokes at a fixed or variable rate while a user provides strokes. In an example, stroke input device 106 may take samples at equal intervals, such as 120 times per second. A sample may collect and accumulate one or more types of data, such as position (e.g. x, y and/or z coordinates) and attributes, such as pressure, gravity vector, acceleration, tilt, etc.

Stroke input device 106 may comply with a human interface device (HID) standard. Stroke data 108 may be provided (for storage and/or analysis) to stroke recognizer 112 or stroke recognizer 130. Stroke data (e.g. at each point) may include, for example, coordinates (e.g. x, y coordinates), timestamp, pressure, x tilt, y tilt, line width, instrument up/down events, hover height and/or other information. Stroke data 108 may comprise a data stream or a data structure (e.g. a table of points as rows with data in columns). Stroke input data 108 may be received by computing device 110, for example, for attribute generation, encoding and recognition processing.

Stroke recognizer 112 (or stroke recognizer 130) may receive and process stroke data 108. Stroke recognizer 112 may comprise or utilize a graphical user interface (GUI), which may be displayed on a display by computing device 110, for various purposes, including to permit user interaction with stroke recognizer 112. In an example, stroke data 108 may be used to present strokes as a user is providing the strokes. A user may indicate (e.g. using the GUI) what stroke recognizer 112 should do with stroke data 108 (e.g. save it as a training data, update/calibrate stroke recognizer 112, determine what stroke data 108 represents, view recognition/classification results generated by stroke recognizer 112, and so on). A user may (e.g. using a GUI) provide an indication of what strokes represent (e.g. for training data).

Stroke recognizer 112 may comprise a (e.g. trainable) stroke recognition model, which may have one or more components. Stroke recognizer 112 may comprise, for example, stroke attribute generator 114, stroke attribute matrix encoder (matrix encoder) 116 and matrix analyzer 118. Stroke attribute generator 114 may generate (e.g. measure, accumulate, calculate) attributes for each stroke input sample or pixel in a stroke input device 106. Matrix encoder 116 may encode attribute values in slots in one or more matrices, for example, by affine mapping between input sample coordinates and matrix coordinates, by interpolation between samples (e.g. to provide values at each coordinate between samples), by applying curve-fitting smoothing, or by other types of encoding. Matrix encoder 116 may perform transformations on the attributes, e.g., to normalize input values. Matrix analyzer 118 may analyze the one or more matrices to determine what user strokes represent.

Stroke attribute generator 114 may receive and process stroke data 108 to generate an array of stroke attributes for sampled positions or areas (e.g. pixels) in a stroke input device, which may be used to encode and analyze matrices to recognize strokes as users intended (e.g. as text, symbols, shapes and/or gestures). Stroke attribute generator 114 may, for example, utilize stroke data as is, adjust (e.g. scale) stroke data 108 or use stroke data 108 in computations to generate additional attributes (e.g. direction and speed). Stroke attribute generator 114 may provide one or more (e.g. one, some or all) attributes to stroke attribute matrix encoder 116.

Figure 2:
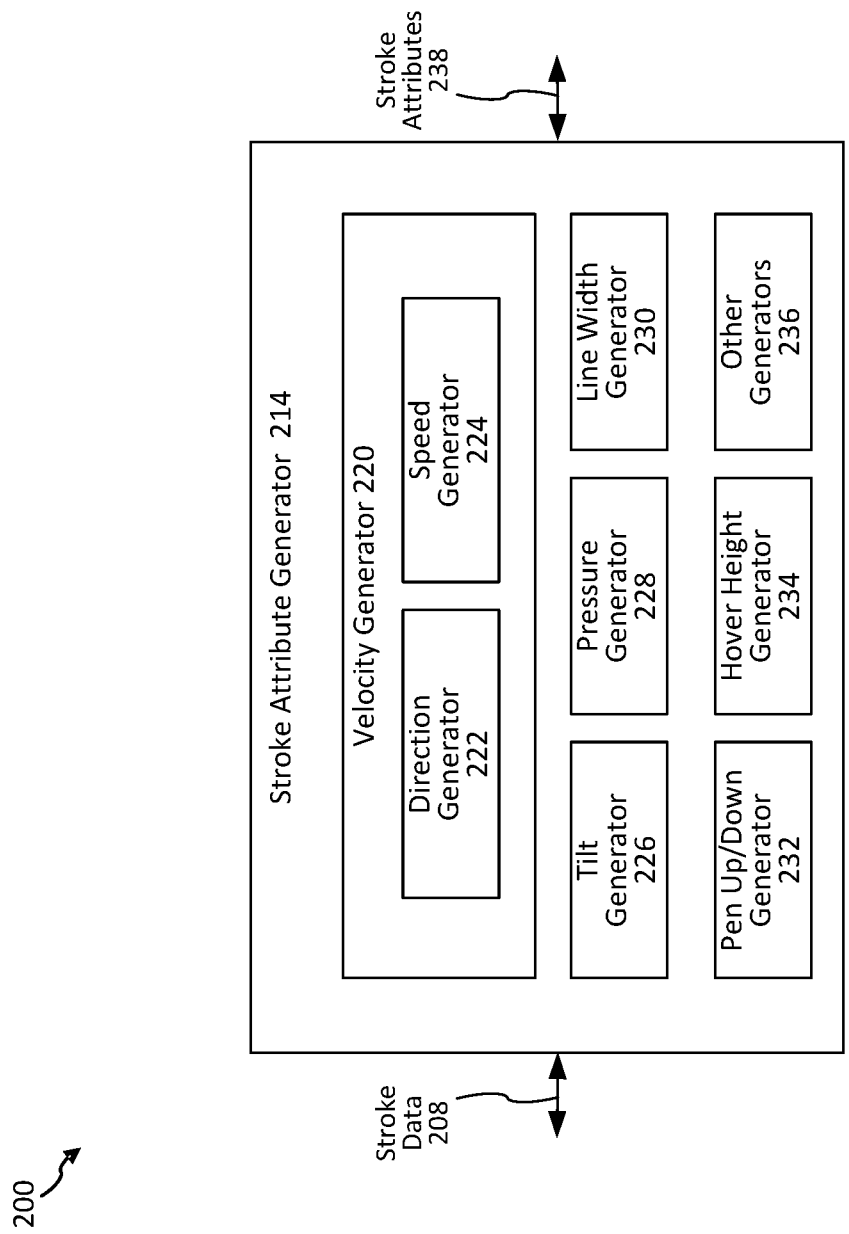
FIG. 2 shows a block diagram of a stroke attribute generator, according to an example embodiment.

FIG. 2 shows a block diagram of a stroke attribute generator, according to an example embodiment. FIG. 2 shows an example implementation 200 of stroke attribute generator 114. Stroke attribute generator 214 receives stroke data 208 (e.g. from stroke input device 106) and generates stroke attributes 238, which may be provided to stroke attribute matrix encoder 116. Stroke attribute generator 214 may comprise one or more attribute generators, which may (e.g. selectively) generate attributes. In an example, one or more generators may generate attributes while one or more other generators may not, for example, at the election of a user, a stroke recognition system and/or based on stroke input.

Stroke data 208 is one example of stroke data 108 of FIG. 1. Stroke data 208 may comprise stroke data at points along strokes sampled by stroke input device 106. For example, stroke input device 106 may sample strokes at a fixed or variable rate while a user provides strokes. Stroke data (e.g. at each point) may include, for example, coordinates (e.g. x, y coordinates), timestamp, pressure, tilt, line width, instrument up/down events, hover height and/or other information. Stroke data 208 may comprise a stream or a table of points as rows with data in columns.

Stroke data 208 may include coordinates for points sampled along strokes. Coordinates (e.g. x, y coordinates) may be associated with each sample along a stroke. In an example, coordinates in stroke data 208 may be based on screen coordinates or other coordinate system associated with stroke input device 106. Attributes may be associated by coordinates (e.g. pixel coordinates). Coordinates (e.g. distances between sample coordinates) may be used to determine attributes.

Stroke data 208 may include timestamps for point samples along strokes. For example, a timestamp may be associated with each sample along a stroke.

Timestamps (e.g. for different coordinates along a stroke) or differences between timestamps may be used to determine other attributes.

Tilt generator 226 may generate tilt attributes. Tilt (e.g. x, y tilt of a detectable instrument) may indicate how a user's hand is swiveling and moving along a stroke input line, which may be used to recognize user intent in creating strokes. Tilt may be utilized similarly to pressure and speed.

Pressure generator 228 may generate pressure attributes. Pressure may be utilized to correlate or distinguish between text, symbols, shapes and/or gestures by a matrix analyzer (e.g. a CNN). In an example, some (e.g. 40%) of users may put more pressure on the bottom part of "a" characters than they do "o" characters. Pressure may, thus, be used to correlate and distinguish between different characters (e.g. in some cases). Pressure may (e.g. also) correlate with an intention to provide thinner or thicker lines in a shape and/or may imply a slower speed or higher precision.

Line width generator 230 may generate line width attributes. Line width may be captured and provided in stroke data 208. Line width may be selected by a user. Line width may be computed, for example, from pressure or from a combination of pressure, tilt and speed. In an example, a user may press a finger (e.g. thumb) on a surface to change line width using a finger or stylus in the other hand. Line width may be an input from a user (e.g. before or while a stroke is made) or may be computed from stroke data 208. Line width may be computed, for example, by using a minimum line width plus a pressure attribute value divided or multiplied by a constant. Line width may be computed, for example, by using a function like a sigmoid or some other curve to map pressure to line width. Line width may be computed, for example, by combining tilt and pressure attribute values. Line width may be computed, for example, using (e.g. only) velocity information. Line width may be computed, for example, by combining pressure, tilt and velocity attribute values. Pressure, tilt and velocity may be combined to mimic a physical pen, fountain pen, brush, etc. on a medium under tilt, pressure and speed.

Regardless of whether line width is provided, selected or computed, line width attribute information may provide a matrix analyzer (e.g. CNN) with information about how precisely a user perceived their stroke(s). Visual feedback of strokes may influence the shape of strokes. For example, a user may try to avoid drawing some parts of strokes close to other parts to avoid a "smudged" or "heavy" appearance. Conversely, a user may not be able to tell whether they are precisely retracing another part of a stroke when it may not be visually apparent how well strokes align. A matrix analyzer (e.g. CNN) may learn how linewidth correlates with other aspects of strokes.

Pen up/down generator 232 may generate pen up/down attributes, for example, for a detectable instrument relative to a surface, such as a touchscreen. Pen up/down attributes may indicate (e.g. demarcate) each continuous stroke provided by a user and/or attributes while a pen is up before it is placed down (e.g. to input a stroke). A path and associated attributes may be maintained, for example, between a pen up and pen down event (e.g. tracking position, hover distance, tilt, velocity while a pen is hovering above a surface at a detectable or undetectable distance). In an example, a straight line may be stored between pen up/down locations, for example, when hover information is not available.

Hover height generator 234 may generate hover height attributes, for example, for a detectable instrument relative to a surface, such as a touchscreen, and/or for virtual reality (VR) or augmented reality (AR). For example, a handheld instrument may be tracked above a surface or "aboveness" (e.g. normal to a general plane of strokes) may be tracked in a 3D setting. For example, a user may lift an instrument between strokes, such as between block letter, cursive words, shapes and so on. Hovering may have a detectable range, outside of which an instrument may not be detectable. Hover distance may be used as a separate data channel or may re-use another data channel (e.g. pressure channel). In an example, hover distance may be maintained as an analog to pressure, scaled to have a similar range of values. In an example, hover information (e.g. height, position, timestamp, tilt) may be collected and stored between pen up and down events.

Other generators 236 may generate other attributes. For example, a change of direction generator may generate change of direction attributes (e.g. at coordinates where there is a substantial change in stroke direction), an acceleration generator may generate acceleration attributes, a stroke-crossing generator may generate stroke crossing attributes (e.g. at coordinates where strokes may intersect), a detectability generator may generate instrument detectability attributes (e.g. as an instrument enters and leaves detectable hover range). For example, a user may accelerate a device or a detectable instrument as a stroke changes direction. In an example, devices with accelerometers could measure whether a device is being jostled while strokes are being entered. Stroke crossings may be implicitly identified by attribute data. A stroke crossing identifier may expressly identify crossings, for example, by analyzing attribute data or by analyzing external data, e.g. by analyzing images of ink emanating from a detectable instrument or rendered ink on a digital device and identifying intersection with previously deposited ink. Hover in and out of detectability range may support hover attribute data, which may determine hover spans from one touchdown to another. Hover data may be combined from multiple data sources, such as, for example, a capacitive sensor detecting a detectable instrument and a camera imaging the detectable instrument or a user's hand or finger. Different hover ranges may have different levels of fidelity of hover distance, position and sample rate.

Velocity attributes may be determined (e.g. by stroke attribute generator 114) based on stroke data 208. For example, velocity may be calculated from differences between (e.g. x, y) coordinate and timestamp data at various sampling points along strokes. Velocity (e.g. angle or direction and speed) provide access to information about which parts of a stroke were drawn quickly versus parts of strokes drawn more slowly (e.g. perhaps with more care). Velocity may comprise, for example, a vector (e.g. x and y magnitudes with an implicit time divisor) or a unit vector (e.g. an angle θ relative to the x axis) and a speed (magnitude with an implicit time divisor along the unit vector or angle). Velocity may be used (e.g. implicitly, by a neural network) to determine the reliability of details of strokes. In an example, slower portions of strokes may be deemed to correlate with higher accuracy. Direction may indicate directions of movement (e.g. motions) by a user who created text, symbols, shapes and/or gestures in digital ink. Motion may indicate user intent, where various deviations in motion may indicate different letters, for example. Direction may provide information about where a stroke instrument (e.g. stylus) was placed down and lifted, which may provide information about stroke order. Stroke order may be useful in correlating appearances with desired input (e.g. letters). Stroke patterns may be traced, for example, to correlate appearances with physical actions taken to realize those appearances and corresponding (e.g. implicit) limitations (e.g. in human hand physiology and/or cultural limitations in how a shape is stroked). Stroke patterns may be "traceable" (e.g. by matrix analyzer 118), for example, by recognizing (e.g. discrete) strokes in various directions that cross or overlap, as opposed to "seeing" an intersecting "jumble," such as when stroke order and stroke segments may be unknown. Matrix analyzer 118 (e.g. a CNN) may find correlations between any of these factors and information in a SAM.

Figure 3:
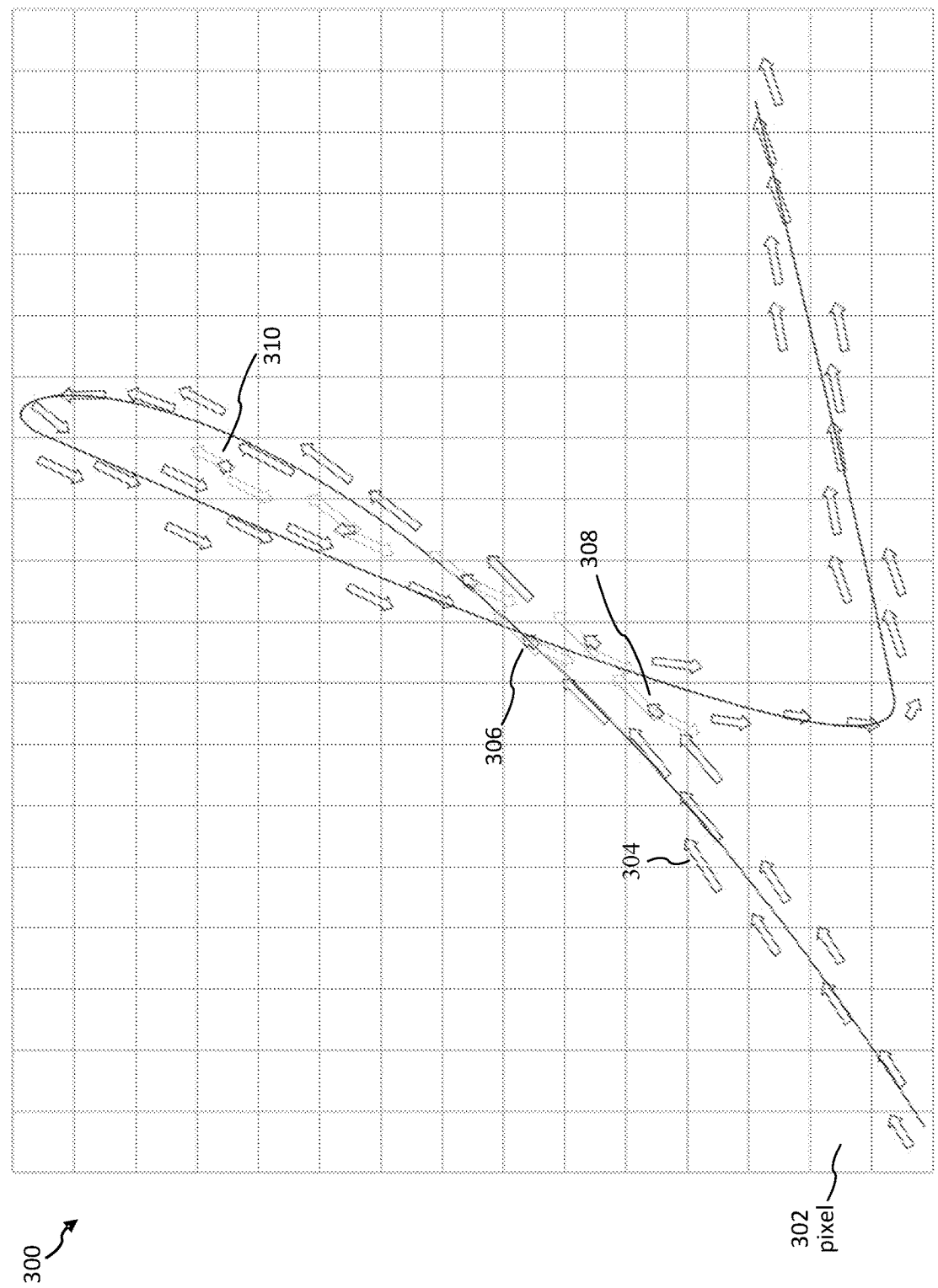
FIG. 3 shows a diagram of a stroke velocity vector field generated by a stroke attribute generator, according to an example embodiment.

FIG. 3 shows a diagram of a stroke velocity vector field generated by a stroke attribute generator, according to an example embodiment. FIG. 3 may be referred to during discussion of attribute generation and attribute encoding. An input device, such as a tablet, may, for example, have a touchscreen integrated in a display with an array of pixels (e.g. 1024×768 pixels). Input devices may have a wide variety of (e.g. higher or lower) resolutions, such as 300 pixels per inch. A user may input/write strokes anywhere on a stroke input device (e.g. on stroke input device 106). For example, a user may be writing in cursive on a tablet. In an example, one of the words written by a user may be "hello," which may be part of a sentence, a paragraph, etc. Example stroke direction field 300 shows a cursive lowercase "l" input by a user in a single stroke. A matrix of (e.g. analysis) cells 302 is shown, e.g., 19 cells wide by 15 cells high in this example, which may be mapped from stroke input coordinates to matrix dimensions appropriate for analysis.

Each (e.g. analysis) matrix cell that a stroke touches may have an array of attributes associated with (e.g. generated for) it. Depending on a sampling rate and stroke speed, there may or may not be a sampling point (and associated attributes) for each cell. In an example, attributes may be extrapolated per cell from available sampling points, for example, by attribute generator 114 or matrix encoder 116. Each arrow 304 refers to the velocity (e.g. speed and direction) of the stroke in each cell touched by the stroke. Longer arrows reference higher speed between sampled points than shorter arrows. Lighter (ghosting) arrows 308 and 310 indicate the velocities at a cell before they were combined (e.g. by addition), where multiple strokes or portions of a stroke touch the same cell. Stroke crossover 306 refers to a location where the stroke crosses itself. Crossover points may be recognized (e.g. by a CNN) and/or distinguished from close proximity, for example, based on a pattern of attribute values in a crossover pixel and adjacent pixels. Attributes received or computed may be stored in cells along stroke paths.

Matrix encoder 116 may encode stroke attributes. Matrix encoder 116 may receive a matrix of cells, each with an array of attributes from stroke attribute generator 114. Matrix encoder 116 may prepare the matrix of arrays of attributes for analysis by matrix analyzer 118, for example, by encoding the array of attributes in matrices. A (e.g. each) matrix prepared by matrix encoder 116 may be based on a bounding box or window of stroke input. Matrix encoder 116 may be configured to create matrices (e.g. size, format) expected by matrix analyzer 118. In an example, bounding box (or window) dimensions selected may be based on size of a convolution kernel in a CNN within matrix analyzer 118. Matrices may be fixed or variable. In an example, matrix encoder 116 may encode attributes in 64×64 or 128×128 matrices. A matrix may comprise a bitmap, for example, where stroke attributes may be encoded as different colors in a bitmap, which may simplify human review of stroke attributes. A matrix (e.g. a bitmap) may have as few or as many attributes or channels as an implementation may require.

Windows may be selected, for example, based on heuristics, such as upstroke (e.g. centering a window where a stroke begins to rise upward), centering one or more letters, etc. In an example, a stroke input window selected by matrix encoder 116 may encompass multiple letters in a word (e.g. "hello"). Input windows may be selected to have none or some degree of overlap with other (e.g. adjacent) input windows. Overlap may be fixed or may vary, for example, to center next letter(s) in a window.

Processing stroke data 108 (e.g. with windows) to generate encoded matrices may involve virtual or actual rendering. In an example, a window may slide along a rendered matrix. A (e.g. whole) matrix may be rendered as a wider matrix, along which a window may virtually slide. As another example, e.g., instead of sliding a window along a rendered matrix, geometric information may be maintained as data (e.g. per sampled input location) while virtually sliding window coordinates and rendering the data into a window matrix. Virtual or physical rendering may be fixed or variable/custom. For example, an original window size (e.g. 128×128) may be varied for matrix encoding.

In an example, there may be a custom rendering for each window/snapshot of a partial view of a full input. A matrix recognizer (e.g. neural network) may be configured and trained for any fixed or variable windowing. In an example, windowing may provide more (e.g. axial) information (e.g., along an x-axis) into a window. This may be implemented, for example, by a matrix or coordinate transform that extracts multiple (e.g. three) windows worth of x-direction data into one window, for example, to provide leading and lagging contextual (e.g. compressed) information either side of primary target under consideration.

In an example of a window onto a stroke attribute matrix, it may be useful to geometrically map stroke attributes such that the middle (e.g. ⅓) of the window is "linear" (e.g. where x and y dimensions have the same proportions) while left and right (e.g. ⅓) of the window are hyperbolic (e.g. in x dimension). For example, a window hyperbolic in the x dimension may show gradually more and more x content moving away from the center. When sliding such an x-hyperbolic window, it may be slid, for example, ⅙th of the width of the window in the x-dimension for each convolution. This may provide a CNN with visibility of more pre and post context in determining what a stroke or stroke sequence (e.g. a character or a character n-gram) represents. In an (e.g. alternative) example, pre- and post-context may be encoded (e.g. with attribute values), for example, using one or more explicit characters (e.g. using a one-hot vector as input) or using single- or multi-character "embeddings" (e.g. trained in a manner analogous to how word embeddings may be trained. Pre- and post-context may be supplied to the matrix analyzer in addition to the CNN matrix.

In an (e.g. alternative) example, an implementation may change geometry and/or render source stroke information using a non-affine (e.g. distortion-inducing) transform.

Matrix encoder 116 may be configured to encode matrices based on a configuration of matrix analyzer 118. For example, matrix analyzer 118 may be configured to provide contextual correction to classification probabilities, for example, by comparing multi-class probabilities for a current recognizer output to preceding recognizer output to provide context to adjust probabilities and/or make decisions. Contextual correction may be provided, for example, using bigrams statistics. A neural network may learn contextual decision making. For example, a neural network (e.g. CNN) may take additional, contextual inputs (e.g. character and/or word embeddings) and learn n-gram "knowledge" (e.g. pattern recognition) to understand what a character/shape represents depending on what comes before and after the character/shape. Classification output probabilities in multi-classification neural networks may be based on (e.g. shifted by) analyzing to one or both sides of an image.

Matrix coordinates may vary from stroke data 108 coordinates. There may be no need to encode and analyze large portions of stroke data 108 coordinate space without any stroke attributes, or without stroke data classified as being part of the recognized types of shapes. Matrix encoder 116 may determine a window or bounding box that encloses stroke input, such as text, symbols, shapes or gestures. For example, a window may enclose words, or portions of words, in a line of text. Also, coordinates may vary due to transformations related to stroke input locations and angles. Some users may enter stroke input top to bottom, some left to right, some without order.

Stroke input may be transformed (e.g. rectified, scaled, rotated, normalized), for example, to place stroke input in similar orientations and similar sizes without distortion relative to norms and expectations, e.g., repositioning stroke input into sizes and orientations that may be expected or more readily recognized by matrix recognizer 118. Input may be rectified (e.g. straightened from various angles written by various users in various situations). A baseline angle may be determined, for example, from a bottom, top or center of most letters in a word. The baseline may (e.g. effectively) be treated as horizontal. In an example, matrix encoder 116 may attempt to place a baseline in approximately the same place for matrix analyzer 118 (e.g. one or more neural networks). In an example, matrix encoder 116 may (e.g. when stroke input may be at an angle) use an affine transform to translate top left corner and bottom right screen coordinates (e.g. from a source square or rectangle) to, for example, 0,0 and 128, 128 target dimensions for a window, essentially creating a rotated bounding box. Input may be normalized in size (e.g. scaled up or down to a relatively common size). Strokes may be scaled, for example, to maintain height and adjust width as needed to avoid deformation relative to a norm. Ascenders (e.g. above a baseline or the main part of letters, such as the x-height) and descenders (e.g. below a baseline) in words may be used to define a pixel height to capture whole words or lines. Heuristic procedures for baseline identification, height estimates and rectification may be used to make such determinations. Baseline identification, height estimates and rectification may be processed as vectors or as a bitmap image or matrix with an image type rotation/transformation.

Matrix encoder 116 may normalize one or more attribute values. Pressure, for example, which may have a value range from 1 to 1023, may be compressed to a range of 0 to 255 (e.g. to fit into a byte of data per attribute/data channel) and may be compressed or stretched based on a maximum or average pressure, for example. Velocity may be normalized. Speed may have an absolute value or a signed value (e.g. along the direction of motion). A range of values may be selected, for example, to avoid data compression to the point of data loss for one or more strokes (e.g. at a stroke intersection). Normalization may be fixed or variable, e.g., to adapt attribute values to a specified range. Normalization may be adaptable (e.g. dynamically), for example, along a stroke or in different regions of a stroke input coordinate space. In an example, normalization may be different for someone who writes slowly versus someone who writes quickly or with a higher range of speed. In an example, minimum and maximum user speed may be normalized to values between 0 and 1, e.g., before conversion to a byte value between 0 and 255.

Matrix cell attribute values may be calculated and extrapolated along stroke paths. For example, moving along a stroke path, speed and direction may be computed for every segment between two sample points. Attribute values may be combined in cells where multiple stroke paths exist or are close (regardless whether they actually touch or cross). New attribute values (for an additional stroke crossing a cell) may be combined with previous values of attributes for the cell (for a first stroke path crossing a cell). Combiner(s) may perform fixed or variable combinations of attribute values. In an example, stroke attributes that range from −0.5 to 0.5 may be mapped to 0 to 255, which may help combined values avoid clipping data. In an example, pressure may be positive, x and y speed may be positive and x and y direction may be backward and forward (e.g. negative and positive). Velocity may (e.g. alternatively) be encoded as angle and speed. Value combinations may change direction(s). In an (e.g. alternative) example, a "combination" of stroke attribute values in a cell may take a maximum of two attribute (e.g. with pressure) values. In an (e.g. alternative) example, multiple attribute values may be combined by XOR. In an (e.g. alternative) example, multiple attribute values may be combined by subtraction. In an (e.g. alternative) example, multiple attribute values may be combined in different ways (e.g. addition, subtraction, accept higher value, accept lower value, XOR, average and so on). In an example, a new attribute value may be added to a previous/existing attribute value that is negative; a new attribute value may be subtracted from a previous/existing attribute value that is positive. A separate data channel may be implemented for combinations and/or for crossings, or metadata may be collected and stored (e.g. regarding types of combinations and/or crossings).

Matrix encoder 116 may encode stroke attributes in multi-dimensional (MD) vector space (e.g. in a matrix such as a color bitmap). Matrix encoder 116 may encode attributes in a variety of formats. In an example, a matrix of pixel data (e.g. 128×128 pixel matrix) may be generated with a vector for each cell/pixel. A (e.g. each) cell vector may provide an array of data values for multiple (e.g. all)

encoded attributes for a pixel (e.g. velocity x, velocity y, pressure, tilt, and so on). In an (e.g. alternative) example, a matrix of pixel data may be generated for each attribute, which may result in a stack or channels of matrices with segregated attribute data values for each window of pixels.

Figure 4:
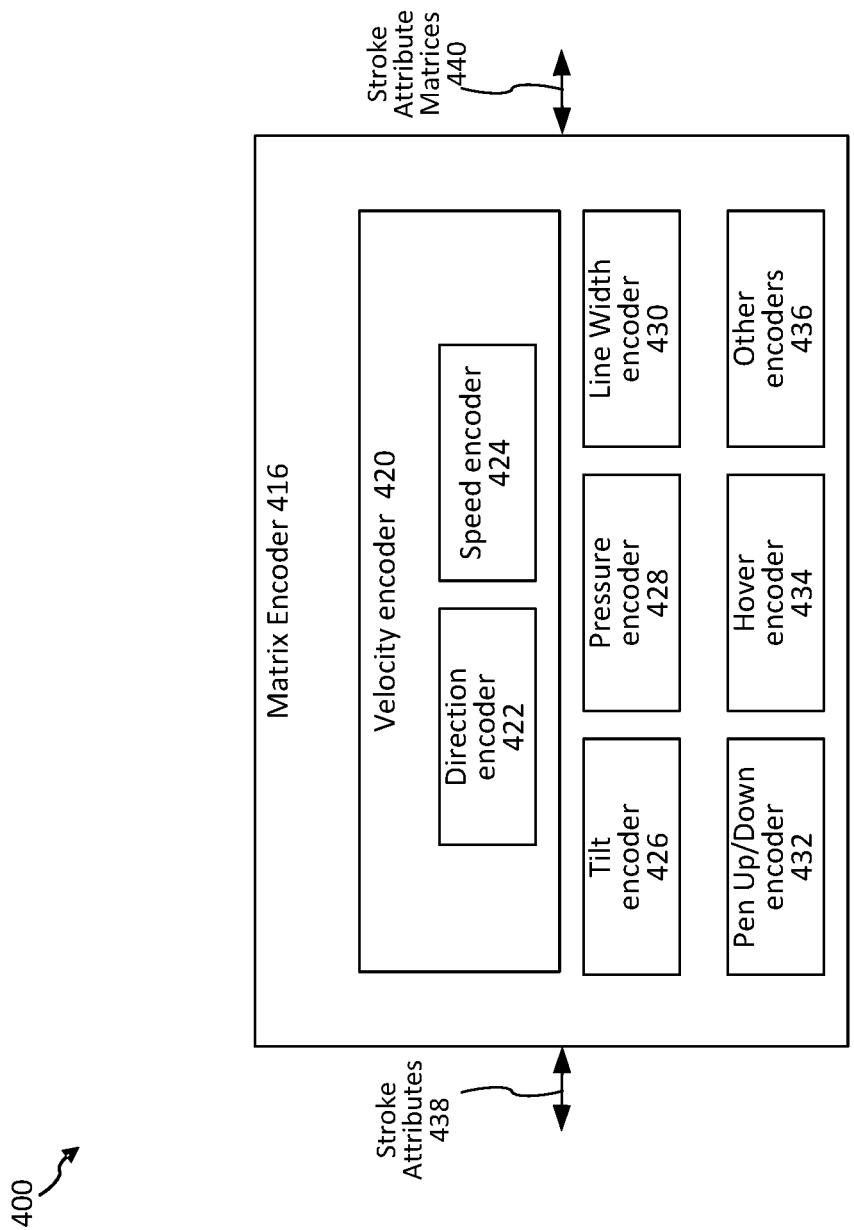
FIG. 4 shows a block diagram of a stroke attribute bitmap encoder, according to an example embodiment.

FIG. 4 shows a block diagram of a stroke attribute matrix encoder, according to an example embodiment. FIG. 4 shows an example 400 of stroke attribute matrix encoder 116.

Matrix encoder 416 receives stroke attributes 238/438 (e.g. from stroke attribute generator 114/414) and generates stroke attribute matrix (SAM) 440, which may be provided to matrix analyzer 118. Matrix encoder 416 may comprise one or more attribute encoders, which may (e.g. selectively) encode attributes. In an example, one or more encoders may encode attributes while one or more other encoders may not, for example, at the election of a user, a configuration of stroke recognizer 112 and/or based on stroke input.

Matrix encoder 416 may select a matrix/bitmap height and width with sufficient resolution for accurate recognition (e.g. by a CNN). Resolution may be, for example, 64×64 or 128×128. A matrix/bitmap may be allocated with the proportions of the input to be processed. Stroke attributes may be mapped onto the coordinate system of the allocated matrix/bitmap. Stroke attribute information may be encoded along a line or curve from one point to the next, e.g. using Bresenham's line algorithm or a Bezier curve implementation. Care should be taken to avoid adding stroke attribute values from a single stroke at the same cell multiple times, e.g., at points where a stroke segment meets the next stroke segment. A list of recently stored point coordinates may be used for this purpose or a rule may be implemented. For example, a rule may indicate where attributes from a stroke segment are stored along its path (e.g. not including a cell where the next segment starts). In an (e.g. alternative) example, such as when attributes are being interpolated in a weighted fashion (e.g. based on time and distance from sampled points), transitions where a cell double-store should be avoided may occur, for example, between two input points rather than at the points themselves.

Matrix encoder 416 may encode attributes in one or more channels. Matrix encoder 416 may encode a (e.g. each) cell with an array of values (e.g. for x-velocity, y-velocity, x-tilt, y-tilt, pressure, line width, pen up/down events, hover heights and so on). A matrix may comprise a bitmap. In an example, x, y direction and x, y speed may be computed and stored as color components (e.g. R, G, B, A) for each cell a stroke touches. Other attributes may be stored as additional colors or channels.

Matrix encoder 416 (or each encoder therein) may encode attribute values as one or more bytes (e.g. a value range between 0 and 255 in one byte with positive and/or negative values), or as bits within bytes (e.g. as nibbles). Matrix encoder 416 may comprise one or more attribute encoders. Matrix encoder 416 may comprise, for example, velocity encoder 420 (e.g. direction encoder 422, speed encoder 424), tilt encoder 426, pressure encoder 428, line width encoder 430, pen up/down encoder 432, hover encoder 434 and/or other encoders 436.

Matrix encoder 416 and/or each encoder therein may comprise a combiner to combine encoded attribute values for multiple strokes (or multiple portions of a stroke) that overlap a cell. Combination may comprise any type of accounting involving multiple encoded values (e.g. addition, subtraction, XORing, picking the first or last value, and so on). For example, combining may comprise adding two encoded values (or encoding two values already added) from multiple strokes and clamping/min-max encoded values (e.g. at 0 and 255). Combination may avoid exceeding minimum and maximum values in an encoded attribute value range. In an example (e.g. where a maximum value is 0.5), combination of attribute values may multiply a first attribute value by 0.9, multiply the second attribute value by 0.1 and add them together. In an example (e.g. where a maximum value is 0.5), combination of attribute values may multiply a second attribute value by 0.5 and add it to the first attribute value. In an example (e.g. where a maximum value is 0.5), combination of attribute values may decrease the influence of the second value (e.g. only) when it would increase or decrease the original value (e.g. beyond a maximum or a minimum attribute value). In an example, a sigmoid or other limiting function may be applied (e.g. instead of clamping after another combining operation such as addition). In an example, x and y attribute values may be considered separately. In an (e.g. alternative) example, a second attribute value or an overflow value of combined values or an average combined value may be stored in one or more (e.g. two) adjacent cells (e.g. an adjacent pixel that isn't otherwise associated with stroke attributes).

Velocity encoder 420 may encode velocity attribute values generated by velocity generator 420. Velocity generator 420 may, for example, encode velocity vectors. For example, velocity encoder 420 may encode x-velocity values and y-velocity values for cells as values in a range from 0 to 255 (in a byte). In an example, zero encoding may represent or map to −0.5 velocity, 127 encoding may map to zero velocity, and 255 encoding may map to +0.5 velocity. Vectors may be scaled to x velocity in the range −0.5 to +0.5 and y velocity in the range −0.5 to +0.5. For example, an x-velocity of 200 and a y-velocity of 100 for a pixel may be represented in FIG. 3 as an arrow pointing to the right and down. Velocity may be normalized, for example, by taking a maximum stroke speed of recognized content for all n, dividing the individual signed x and y speeds between any two sequential points by twice the maximum speed (e.g. to get values in the range −0.5 to 0.5). Pythagoras theorem may not be used to determine distance in x and y between stroke points (e.g. pt). In an example, maximum stroke speed (e.g. maxSpeed) may be determined by Eq. 1:

$$\text{maxSpeed} = \max_n \frac{\sqrt{(pt_n \cdot x - pt_{n-1} \cdot x)^2 + (pt_n \cdot y - pt_{n-1} \cdot y)^2}}{pt_n \cdot \text{time} - pt_{n-1} \cdot \text{time}}$$

Velocity encoder 420 may comprise, for example, direction encoder 422 and speed encoder 424. Direction encoder 422 may encode direction attribute values generated by direction generator 222. Direction encoder 422 may encode direction e.g. in (x, y directions) as an independent component or as a component of velocity. A variety of types of normalization may be used, for example, as alternatives to normalization by using the maximum speed across an input (e.g. a word, a line, or document). In an example, direction values may be normalized for encoding, for example, using instantaneous speed at a given point or a speed from the previous point to a given point. In an example, direction (e.g. and speed or other attribute) values may be normalized, for example, by dividing x and y translation from a previous point to a given point by a normalizing factor in accordance with Eq. 2 (e.g. with or without the time-related denominator):

$$\text{normSpeed} = \frac{\sqrt{(pt_n \cdot x - pt_{n-1} \cdot x)^2 + (pt_n \cdot y - pt_{n-1} \cdot y)^2}}{pt_{n+1} \cdot \text{time} - pt_n \cdot \text{time}}$$

Speed encoder 424 may encode speed attribute values generated by speed generator 224. Speed encoder 424 may encode speed (e.g. in x, y directions) as an independent component or as a component of velocity. Speed may be computed at each point (e.g. pixel), for example, in accordance with Eq. 3:

$$\text{speed} = \frac{\dfrac{\sqrt{(pt_n \cdot x - pt_{n-1} \cdot x)^2 + (pt_n \cdot y - pt_{n-1} \cdot y)^2}}{pt_n \cdot \text{time} - pt_{n-1} \cdot \text{time}}}{\max_n \dfrac{\sqrt{(pt_n \cdot x - pt_{n-1} \cdot x)^2 + (pt_n \cdot y - pt_{n-1} \cdot y)^2}}{pt_n \cdot \text{time} - pt_{n-1} \cdot \text{time}}}$$

Speed attribute values may be stored, for example, as values from 0 to 1 or 0 to 255. Speed may be scaled linearly or nonlinearly relative to a maximum speed. In an example, speed may be passed through a function to increase or decrease different parts of the speed range, for example, to provide extra differentiation between speeds of interest. In an example, all speeds greater than 1.5 times an average speed may be treated as a "maximum speed," e.g., to provide more differentiation between slower speeds.

Tilt encoder 426 may encode (e.g. x and y) tilt attribute values generated by tilt generator 226. Tilt attribute values may be scaled linearly or nonlinearly (e.g. to fit in available encoded value range and/or to provide increased resolution over one or more value ranges) prior to encoding them. In an example, (e.g. x and y) tilt may be scaled as positive and negative values (e.g. indicating axial tilt direction), for example, to fit a desired value range in one or more bytes, such as 0-255, which may combine with tilt values from intersecting strokes without losing information.

Pressure encoder 428 may encode tilt attribute values generated by pressure generator 228. Pressure attribute values may be scaled linearly or nonlinearly (e.g. to fit in available encoded value range and/or to provide increased resolution over one or more value ranges) prior to encoding them. In an example, pressure may be scaled as positive values to fit a desired value range in one or more bytes, such as 0-255.

Line width encoder 430 may encode line width attribute values generated by line width generator 230. Line width attribute values may be scaled linearly or nonlinearly (e.g. to fit in available encoded value range and/or to provide increased resolution over one or more value ranges) prior to encoding them. In an example, line width may be scaled as positive values to fit a desired value range in one or more bytes, such as 0-255.

Pen up/down encoder 432 may encode pen up/down attribute values generated by pen up/down generator 232. Pen up/down attribute values may be scaled linearly or nonlinearly (e.g. to fit in available encoded value range and/or to provide increased resolution over one or more value ranges) prior to encoding them. In an example, pen up/down may be scaled as positive and/or negative values to fit a desired value range in one or more bytes, such as 0-255, or may be stored as Booleans, with, for example, one value representing pen up, and one representing pen down (e.g. with opposite sign). In an example, pen up/down data may be combined with a different channel, such as pressure or hover distance.

In an example, a user may stroke a word and then go back and edit it with more strokes. For example, a user may add a diacritic mark over the text or may try to clarify one or more letters. It may be beneficial for a matrix recognizer (e.g. a CNN) to have visibility into such temporal discrepancies by encoding them into matrices. In an example, a straight line of metadata may be encoded from any "pen up" event to any "pen down" event. Encoded attribute values may be stored, for example, using a separate channel, or by using the pressure channel to store negative values (e.g. values less than 127 assuming a signed range of 0-255 with 127 representing 0), or by using velocity channels and encoding the straight line with a direction and a (e.g. fixed) speed (e.g. 0). More elaborate data may be stored between strokes (e.g. beyond a virtual/imaginary line between pen up and pen down), for example, when hover attribute generation and encoding exists.

Hover encoder 434 may encode hover attribute values generated by hover height generator 234. Hover attribute values may be scaled linearly or nonlinearly (e.g. to fit in available encoded value range and/or to provide increased resolution over one or more value ranges) prior to encoding them. In an example, hover height may be scaled as positive values (e.g. above a surface) to fit a desired value range in one or more bytes, such as 0-255.

Other encoders 436 may encode other attribute values generated by other generators 236. For example, a change of direction encoder may encode change of direction attributes, an acceleration encoder may encode acceleration attributes, a stroke crossing encoder may encode stroke crossing attributes, a detectability generator may encode instrument detectability attributes, etc. Attribute values may be scaled linearly or nonlinearly (e.g. to fit in available encoded value range and/or to provide increased resolution over one or more value ranges) prior to encoding them. In an example, attribute values may be scaled as positive and/or negative values to fit a desired value range in one or more bytes, such as 0-255.

Matrix encoder 416 may encode stroke attributes in any matrix (e.g. any bitmap) format. In an example, stroke attribute metadata may be encoded in a bitmap header (e.g. in a header section accompanying or replacing other image information, such as image size, x pixels per meter and so on). Stroke attribute metadata may describe how the bitmap encodes stroke attributes. In an example, stroke attribute metadata may indicate (e.g. among other stroke attribute information) that R and G are used for velocity attribute values, e.g., with 127 representing 0 velocity, lower values indicating negative values, and that the origin of the bitmap is at the top left (for example). This makes it possible for developers to (e.g. easily) visually inspect data that matrix encoder 116/416 generates as SAMs 440. As far as matrix recognizer 118 may be concerned, "bitmaps" may be defined using a first dimension and second dimension extension (e.g. width and height), and a number of channels (e.g. 4 channels in the case of RGBA). In an example, these matrixes may store floating point values, e.g. in the range 0 to 1, or −1 to 1, although some systems (e.g. systems optimizing processing for space) may utilize one or more byte values (e.g. 0-255), interpreting values linearly or logarithmically as floating point values (e.g. through quantization). In an example, a developer may visualize a matrix, for example, by converting a matrix of arrays of floating point values to a matrix of arrays of color channels (e.g. 4 channels with one byte per channel, 6 channels with two bytes per channel or any other arrangement), and converting to an image format (e.g. png, bmp or jpg) for display. In an example, a user may write the phrase "Stroke Field Bitmap" as cursive input. Speed and direction attribute values computed from sampled data while "Stroke Field Bitmap" was entered may be encoded, respectively, for example, as red and green relative to mid gray as zero. A matrix generated for this input and its associated attribute values may be visualized as colored pixels along the stroke path of "Stroke Field Bitmap."

Matrix analyzer 118 may analyze one or more matrices generated by matrix encoder 116 to determine what user strokes represent. Matrix analyzer 118 may be implemented locally, e.g. by stroke recognizer 112, or remotely, e.g., by stroke recognizer 130. In an example, stroke recognizer 112 may provide stroke data 108, stroke attributes 238 or stroke attribute matrices 440 to server(s) 128 for stroke recognition.

Matrix analyzer 118 may generate one or more classifications. For example, matrix analyzer 118 may output multiple classifications with multiple probabilities (e.g. for human or automated decision-making) or may output an (e.g. a single) output selected therefrom. Matrix analyzer 118 may comprise multiple classifiers, which may operate in parallel on encoded matrices. Classifiers may comprise multi-class classifiers. Classifiers may include, for example, a character classifier, n-gram classifiers, a word classifier, a shape classifier, a gesture classifier, exclusive classifiers such as "unknown" or "not-a-character" classifiers, and so on. Classifiers may be selectively applied, for example, based on selection or detection, such as language (e.g. English, French, Spanish, Chinese and so on), different types of input (e.g. as a whole or in regions of stroke input). Classifier(s) may be used to select between classifiers used to classify input. Regions in an image may be identified to use each classifier(s) on. Different types of input (e.g. with potentially different applicable CNNs) may include, for example, printed text, cursive text, sloppy cursive, sloppy printed, character-at-a-time, character-n-gram-at-a-time, word-at-a-time, geometric shapes, animal shapes, editing gestures, viewing gestures, etc.

As previously discussed, user input may be separated into (e.g. overlapping) windows encoded as a set of matrices. Each matrix may be analyzed in smaller (e.g. overlapping) portions (e.g. windows). Each classifier (e.g. CNN) in a set of classifiers may generate a set of classifications with a set of probabilities for each portion (e.g. window) of a matrix (which may itself be a portion of a larger input).

A CNN may be configured for and provided with certain (e.g. square) windows (e.g. snapshots) onto SAM 440. Windows may be selected, for example, based on fixed horizontal offsets or positioned relative to features of the input, such as bottoms of strokes, upward strokes, or a fixed distance interval (e.g. when no feature is seen within a certain distance for cases where the input lacks such features in part of the input SAM). Each neural network (e.g. CNN) may be trained to output one or more of a possible set of characters, "unknown" or "not-a-character," n-grams, shapes, gestures and so on for each input window. CNN output may be, for example, a softmax over a one-hot vector of possibilities, such as characters and other possible outcomes listed above.

A selection may be made from among the available probabilistic classifications by one or more CNNs for each window analyzed for each matrix. A set of selected classifications for a matrix (e.g. or a group of matrices that may capture an entire input by a user) may be analyzed for cumulative sequence classification. In an example, cumulative classification may be provided by a hidden Markov model (HMM) or a neural network, such as a long short-term memory model (LS™) network, which may focus on candidates with the highest probabilities for each window. Candidate text, shape and/or gestures may be further re-ranked, for example, based on language models that provide statistical information about sequences of characters, shapes (e.g. bullet points) and words. Language model output (e.g. a context embedding) may be fed as input to the window-level recognizer network (e.g. CNNs) to merge this functionality and improve initial (e.g. window level) classifications.

Matrix analyzer 118 or stroke recognizer 112 may be configured to provide contextual correction to classification probabilities, for example, by comparing multi-class probabilities for a current analyzer or recognizer output to preceding analyzer or recognizer output to provide context to adjust probabilities and/or make decisions. A neural network may learn contextual decision making. For example, a neural network (e.g. CNN) may learn n-gram "knowledge" (e.g. pattern recognition) to understand what a character/shape represents depending on what comes before and after the character/shape. Classification output probabilities in multi-classification neural networks may be based on (e.g. shifted by) analyzing to one or both sides of an image.

Matrix analyzer 118 may comprise one or more (e.g. trainable) neural networks, such as convolutional neural networks (CNNs). Matrix analyzer 118 may be trained, for example, using training data 122. A neural network (e.g. CNN) may be trained to output one or more of a possible set of characters, "unknown" or "not-a-character," n-grams, shapes, gestures and so on for each input window. Training data used to train CNNs may comprise empirical data (e.g. "ground truth"), which may be provided by human review, semi-automated generation and human review or by unsupervised means such as clustering and similarity-based metrics based on the output of the CNN after it has been previously trained by supervised input.

Training data 122 may comprise stroke attribute matrices associated with known/recognized outputs. During training, stroke attribute matrices may be provided as input, and truths (known outputs) may be provided as output to matrix analyzer 118. Each known input may be accompanied by a 100% probability in the output layer for the known output. In an example, known input may be accompanied by probabilities distributed among outputs in the output layer that are similar to the known output, for example, based on human understanding, image analysis output, or the output from a (e.g. larger) trained network, which may generate probabilities for many possible outputs for the given input (e.g. based on the similarity of those outputs). Matrix analyzer 118 may be calibrated after training, for example, using additional known stroke attribute matrices. Additional training data 122 may be provided, for example, by users providing additional stroke input through stroke input device 106 and by providing stroke recognizer 112 with confirmed output and by instructing stroke recognizer 112 to store and/or use the stroke input as training data, which may be stored in storage 120 as training data 122. A matrix analyzer (e.g. a CNN) may be trained with and without an attribute (e.g. tilt), for example, to determine how each attribute may impact recognition accuracy. A matrix analyzer (e.g. a CNN) may be trained with and without different attribute transformation functions and function parameters, for example, to compare functions and select functions that generate more reliable output or for improved time or space (memory) performance. Some CNNs may utilize one or more attributes while others may not, such as when an attribute fails to significantly impact accuracy, indicating an attribute may not be worth the extra computational cost, at least for one or more CNNs.

Figure 5:
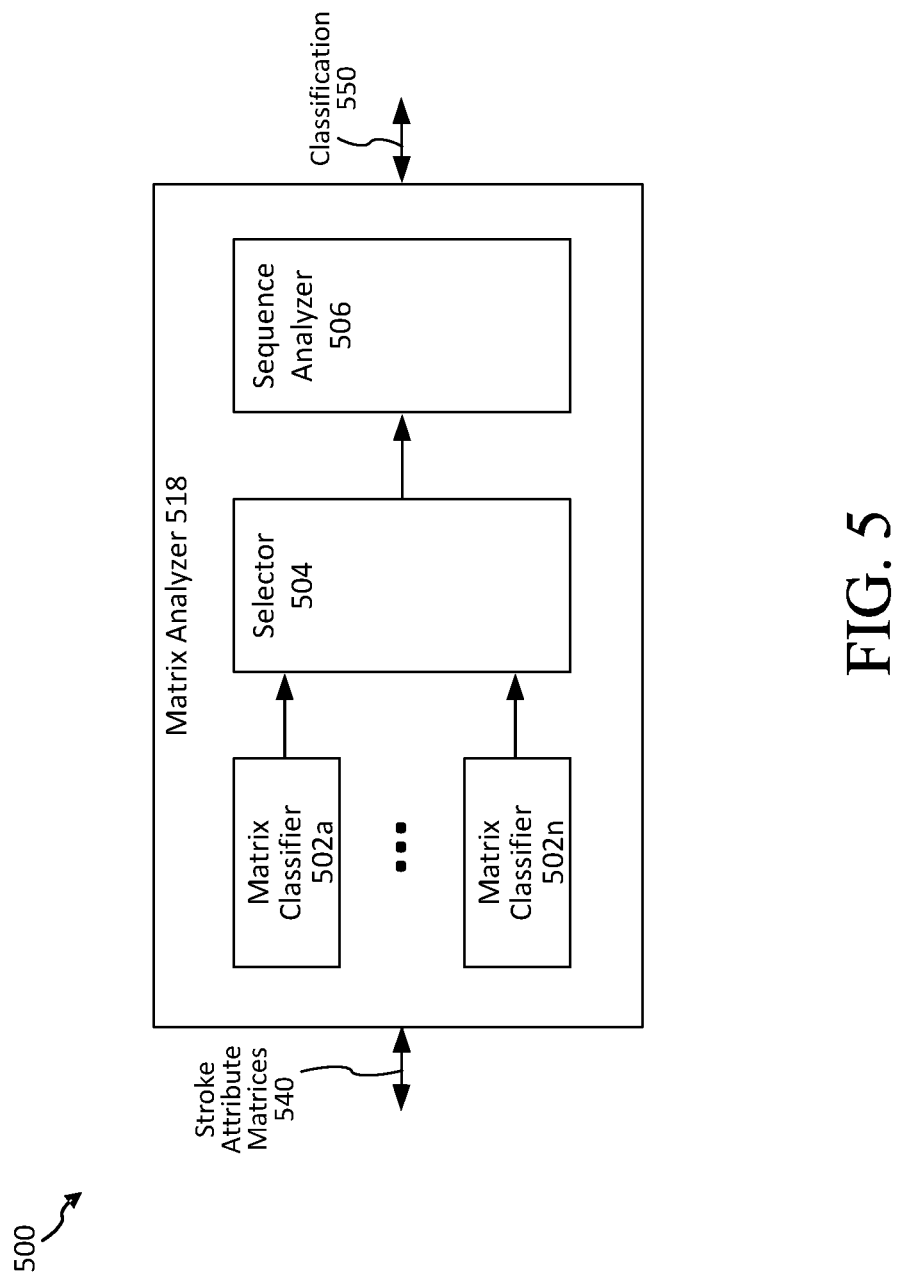
FIG. 5 shows a block diagram of a matrix analyzer, according to an example embodiment.

FIG. 5 shows a block diagram of a matrix recognizer (e.g. bitmap classifier), according to an example embodiment. Matrix analyzer 518 shows an example 500 of matrix analyzer 118. Matrix analyzer 518 may analyze one or more matrices generated by matrix encoder 116/416 to determine what user strokes represent. Matrix analyzer 518 may receive stroke attribute matrix 540 and generate classification 550. Stroke attribute matrices (SAMs) 540 input may comprise a series of matrices (e.g. from stroke attribute matrix encoder 116), such as a series of 128×128 cell matrices. Matrix analyzer 518 may comprise, for example, multiple (e.g. a set of) matrix classifiers 502a-n, selector 504 and sequence analyzer 506.

Matrix classifiers 502a-n may comprise a variety of trained or trainable neural networks, such as CNNs. In an example, matrix classifiers 502a-n may comprise multiple CNNs, which may operate in parallel on stroke attribute matrix 540 input. In an example, matrix classifiers 502a-n may comprise categorical classifiers (e.g. text (single letter or n-gram with multiple characters), symbol, shape, gesture, unknown), text/character classifiers (e.g. letters, n-grams, unknown, etc.), symbol classifiers (e.g. hyphen, colon, comma, dash, asterisk, exclamation point, unknown, etc.), shape classifiers (e.g. circle, square, triangle, rectangle, bird, apple, unknown, etc.) and gesture classifiers (e.g. enlarge, shrink, page up/down, open, close, unknown, etc.). Matrix classifiers 502a-n may (e.g. each) generate multiple classifications associated with probabilities.

Matrix classifiers 502a-n may be configured to receive as input square windows (e.g. 128×128 pixels) or any other configuration selected for text, shape and/or gesture input. Strokes may be (e.g. virtually) drawn into 128×128 matrices (e.g. bitmaps) based on stroke data 108, which may consist of a pen down event followed by sample points as the input device samples stroke input (e.g. where spacing between points may vary during variable speed strokes and fixed interval sampling). Matrix classifiers 502a-n may implement a hyperbolic perspective (e.g. with compressed axial data, such as x and/or y directions). Convolution may (e.g. effectively) downsample between layers, reducing an original size of stroke attribute matrix (SAM) 540 input. Each convolution layer may take a maximum, most distinct value, or other function for each region of a matrix.

Stroke attribute information may be encoded with pre and post textual/symbolic information, such as encoding that there is some text first with no ascenders, then with an ascender to the left, or actual, already-recognized characters) content. While this could be provided as input to CNNs in matrix classifiers 502a-n, this information may (e.g. instead) be provided further "up" the CNNs, (e.g. close to fully connected, final, readout layer), for example, so that the (e.g. one-hot) final layer may receive as input a combination of abstract information about the matrix (e.g. bitmap image) and optional pre- and post-context cues (e.g. in the form of one-hot or embedding vectors encoding characters, words or crude textual information, such as information about capitals, ascenders, descenders, and so on).

Matrix classifiers 502a-n (e.g. CNNs) may process SAMs 440 similar to processing any image (e.g. a grayscale 2D matrix of arrays of single floating point values). A CNN may see each SAM as a 2D matrix of arrays of some number of stroke attribute values. Convolution kernels may process successive areas, e.g. 5×5 kernel windows over the 2D matrix. Instead of seeing gray levels, or RGB levels indicating a visual appearance, CNNs would see semantically richer stroke-related information, and be able to build up convolution filters that would react to different arrangements of stroke attributes (e.g. directions, velocities, pressures, tilts, and so on). In subsequent convolution layers, there may be successively more abstract representations of the underlying content, which may encapsulate information relevant to making a determination of what the output should be as a representation of user strokes (e.g. a specific character, word, shape, gesture). Instead of making determinations based on relative position of grayscale "ink," CNNs may, instead, make determinations based on the relative position and intensity of directional and speed information (and/or other stroke attribute values). Stroke attributes may provide more information about the physical activity that generated the digital ink, including physiological motion constraints being experienced by the user. Physical activity may be informative with respect to interpretation/classification. In an example, activity information may provide information about the extent of a part of a stroke. For example, a curve may not reach as high as expected, because (e.g. stroke attribute data shows) the hand and fingers were being slowed down by the fact that they were reaching the limits of extension in a given direction for the user's hand and fingers at that time.

Selector 504 may select output from matrix classifiers 502a-n. Selector 504 may, for example, select a CNN classification for stroke attribute matrix 540 input (e.g. to provide to sequence analyzer 506) based on comparative probabilities provided by matrix classifiers 502a-n. Selector 504 may comprise a neural network that takes the outputs of matrix classifiers 502a-n as inputs to select an output to pass to sequence analyzer 506. Selector 504 may select a mix of different CNNs in a series/sequence of windows analyzed by matrix classifiers 502a-n. Selector 504 may remember previous decisions (e.g. with an exponential moving average), which may provide a bias for subsequent selections. In an example, previous selections by selector 504 may be provided as (e.g. feedback) input into selector 504. In an example, for an input "H," selector 504 may select a letter CNN. For an "e" input, selector 504 may misfire and select a shape CNN. For inputs "l" and 'l," selector 504 may select the letter CNN. For an "o" input, selector may select a letter CNN. The majority of selections (e.g. letter CNNs) in a series of selections may be utilized by selector 504 to process letter CNN outputs for the entire series (e.g. a sequence of letters).

Sequence analyzer 506 may comprise a combiner. A combiner may be implemented to process CNN output selected by selector 504. Sequence analyzer 506 may identify phrases, sentences, equations, mixed content (e.g. bullet point symbols or shapes with a textual list), etc. in a series of selections by selector 504. Sequence analyzer 506 may comprise, for example, a sequence to sequence model. In an example, sequence analyzer 506 may comprise a hidden Markov model (HMM) or a neural network, such as a long short-term memory model (LSTM) network. Sequence analyzer 506 may provide multi-classification (e.g. generate multiple classification outputs with associated probabilities) or may determine a (e.g. single) classification therefrom, either of which may be output as classification 550. Subsequent recognition processing (e.g. when classification 550 may comprise multi-class output) may be provided by matrix recognizer 112 and/or other text, symbol, shape and/or gesture recognition components, such as a text tool like Fluency, which was developed by TouchType Ltd. (a subsidiary of Microsoft Corporation).

In an example, sequence analyzer may analyze a sequence of outputs selected by selector 504 (e.g. "H e i l l o) to select an output consistent with the sequence (e.g. "Hello") based on sequence context and language model data. In an example, having a sequence context of, "Hello, how are," sequence analyzer 506 may determine the next word is "you," e.g., based on the letter or word output (e.g. "yau") from matrix classifier 502*a*-*n* selected by selector 504, the sequence context and language model data.

Implementations are not limited to the examples shown. Any number of computing devices and/or servers (including but not limited to machines and/or virtual machines) may be coupled in any manner via any type of computing environment. For example, one or more of computing device, server or storage components may be co-located, located remote from each other, combined or integrated on or distributed across one or more real or virtual machines.

Figure 6:
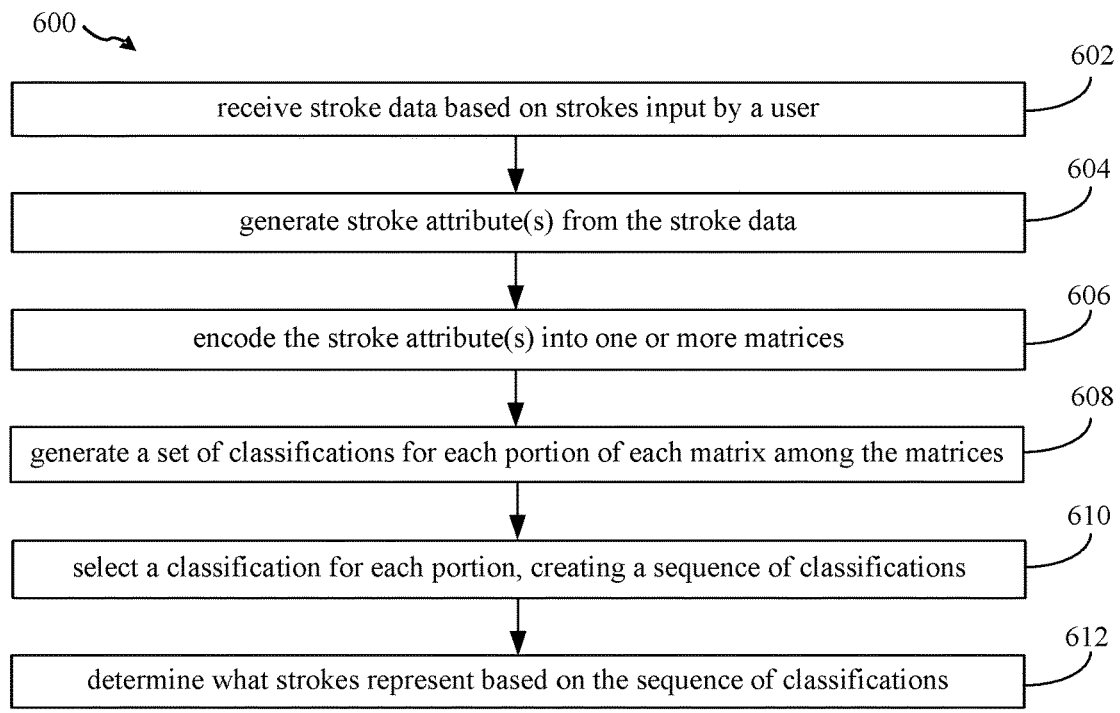
FIG. 6 shows a flowchart of a method for determining what user strokes represent using stroke attribute matrices, according to an example embodiment.
Figure 7:
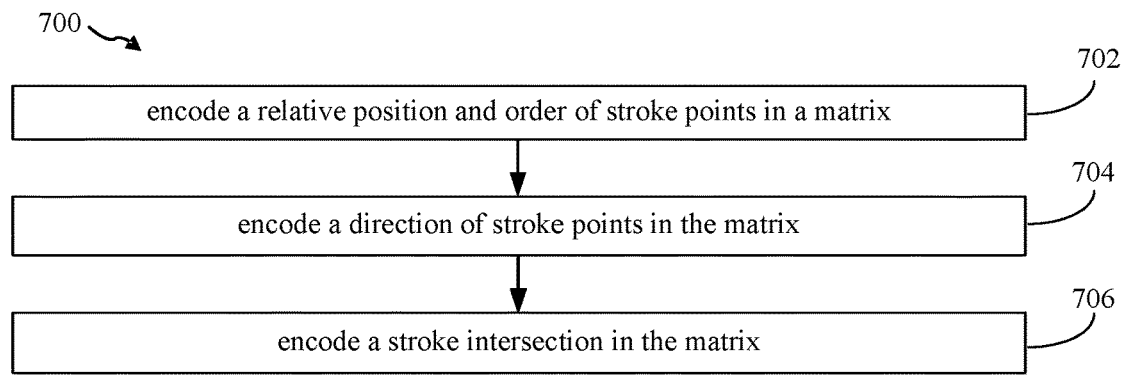
FIG. 7 shows a flowchart of a method for encoding stroke attributes in a matrix, according to an example embodiment.
Figure 8:
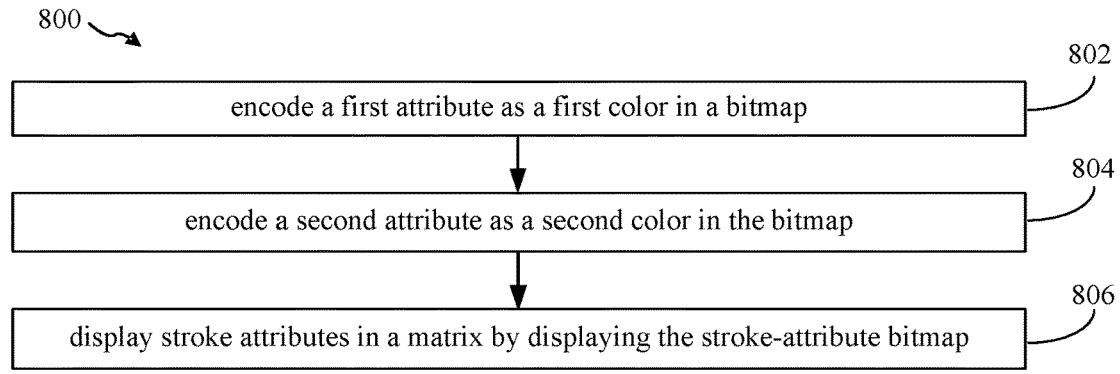
FIG. 8 shows a flowchart of a method for encoding and viewing stroke attributes in a color bitmap, according to an example embodiment.

Examples shown and discussed with respect to FIGS. 1-5 may operate, for example, according to example methods presented in FIGS. 6-8.

FIG. 6 shows a flowchart of a method 600 for determining what user strokes represent via stroke attribute matrices, according to an example embodiment. Embodiments disclosed herein and other embodiments may operate in accordance with example method 600. Method 600 comprises steps 602-612. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps.

Method 600 comprises step 602. In step 602, stroke data may be received based on strokes input by a user. For example, as shown in FIG. 1, user1 102 may input strokes on stroke input device 106, which may generate stroke data 108 and provide it to stroke recognizer 112 through computing device 110.

In step 604, stroke attribute(s) may be generated from the stroke data. For example, as shown in FIGS. 1 and 2, stroke attribute generator 114/214, and any attribute generator therein, may generate stroke attributes 238, such as velocity (e.g. direction, speed), tilt, pressure, line width, pen up/down, hover height and/or other attributes from stroke data 108/208.

In step 606, stroke attribute(s) may be encoded into one or more matrices. For example, as shown in FIGS. 1 and 4, matrix encoder 116/416, and any encoder therein, may encode stroke attributes 238/438 into stroke attribute matrices 440.

In step 608, a set of classifications may be generated for each portion of each matrix among the matrices. For example, as shown in FIGS. 1 and 5, matrix analyzer 118/518 (e.g. matrix classifier(s) 502*a*-*n*) may generate a set of classifications for each portion of each matrix in stroke attribute matrices 440/540.

In step 610, a classification may be selected for each portion, creating a sequence of classifications. For example, as shown in FIG. 5, selector 504 may determine (e.g. select) which classification among each set of classifications (for each portion of each matrix processed by matrix classifiers 502*a*-*n*) should be provided to sequence analyzer 506. A series of selections by selector 504 may create a sequence of classifications. Selections may include more than one classification from each set of classifications.

In step 612, a determination may be made as to what strokes represent based on the sequence of classifications. For example, as shown in FIG. 5, sequence analyzer 506 may process the sequence of classifications to generate classification 550, indicating what user strokes represent. Sequence analyzer 506 may select, reject or ignore and/or correct classifications in the sequence of classifications to reach a determination about what the strokes represent.

FIG. 7 shows a flowchart of a method 700 for encoding stroke attributes in a matrix. Embodiments disclosed herein and other embodiments may operate in accordance with example method 700. Method 700 comprises steps 702-706. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 7. FIG. 7 is simply one of many possible embodiments. Embodiments may implement fewer, more or different steps.

Method 700 comprises step 702. In step 702, a relative position and order of stroke points may be encoded in a matrix. For example, as shown in FIGS. 1, 2 and 4, stroke attribute generator 114/214 may generate stroke attributes 238 with temporal and coordinate stroke data received in stroke data 208 and/or extrapolated therefrom (e.g. for pixels between sample points in stroke data 208). Matrix encoder 416 may encode temporal and coordinate information in stroke attributes 238/438 into stroke attribute matrices 440.

In step 704, a direction of stroke points may be encoded in the matrix. For example, as shown in FIGS. 1-4, velocity encoder 420 or direction encoder 422 may encode direction attributes in stroke attributes 238/438 into stroke attribute matrices 440.

In step 706, a stroke intersection may be encoded in the matrix. For example, as shown in FIGS. 1-4, matrix encoder 416 (and/or any encoder therein) may encode stroke attributes 238/438 into stroke attribute matrices 440 to reflect stroke intersections. As previously discussed, stroke attributes may be combined (e.g. by addition, subtraction, accepting higher value, accepting lower value, XORing, averaging and so on) in a way that is detectable by matrix analyzer 118/518.

FIG. 8 shows a flowchart of a method 800 for encoding and viewing stroke attributes in a color bitmap. Embodiments disclosed herein and other embodiments may operate in accordance with example method 800. Method 800 comprises steps 802-806. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 8. FIG. 8 is simply one of many possible embodiments. Embodiments may implement fewer, more or different steps.

Method 800 comprises step 802. In step 802, a first attribute may be encoded as a first color in a bitmap. For example, as shown in FIGS. 1, 2 and 4, stroke attribute generator 114/214 may generate stroke attributes 238 from stroke data received in stroke data 208 and/or extrapolated therefrom (e.g. for cells between sample points in stroke data 208). Matrix encoder 416 may encode stroke attributes 238/438 into stroke attribute matrices 440. A bitmap comprises a matrix of pixel color channels. A first attribute may be encoded in a first pixel color channel of a bitmap. Bitmap metadata may describe how attributes are encoded in color channels.

In step 804, a second attribute may be encoded as a second color in a bitmap. For example, as shown in FIGS. 1, 2 and 4, stroke attribute generator 114/214 may generate stroke attributes 238 from stroke data received in stroke data 208 and/or extrapolated therefrom (e.g. for cells between sample points in stroke data 208). Matrix encoder 416 may encode stroke attributes 238/438 into stroke attribute matrices 440. A bitmap comprises a matrix of pixel color channels. A second attribute may be encoded in a second pixel color channel of a bitmap. Bitmap metadata may describe how attributes are encoded in color channels.

In step 806, stroke attributes in a matrix may be displayed by displaying the stroke-attribute encoded bitmap. For example, as shown in FIG. 1, computing device 110 and/or server(s) 128 (e.g. through a GUI utilized by stroke recognizer 112 or 130) may display the stroke-attribute encoded bitmap to permit user 102 to visualize a stroke attribute matrix (e.g. how attributes are encoded for each pixel).

III. Example Computing Device Embodiments

As noted herein, the embodiments described, along with any modules, components and/or subcomponents thereof (e.g., computing device 110, server(s) 128, stroke recognizer 112, stroke recognizer 130, etc.) as well as the flowcharts/flow diagrams described herein (e.g., example methods 600, 700, 800), including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
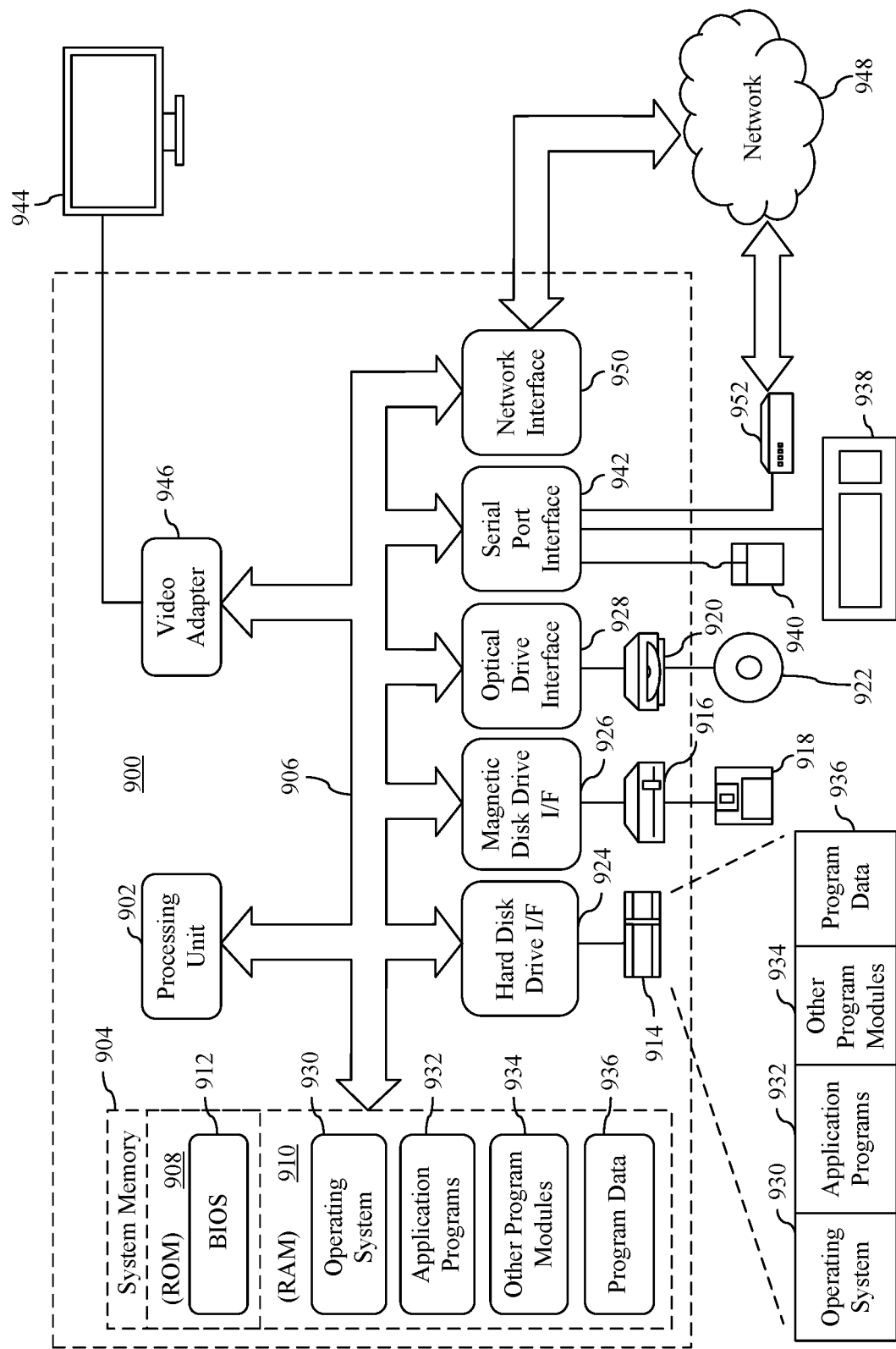
FIG. 9 shows a block diagram of an example computing device that may be used to implement example embodiments.

FIG. 9 shows an exemplary implementation of a computing device 900 in which example embodiments may be implemented. Consistent with all other descriptions provided herein, the description of computing device 900 is a non-limiting example for purposes of illustration. Example embodiments may be implemented in other types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing example embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of example embodiments described herein. Accordingly, such computer programs represent controllers of the computing device 900.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems, and computer program products are provided for stroke attribute matrices. User input strokes may be converted into attributes encoded in one or more stroke attribute matrices (SAMs), such as bitmaps, for image or other multidimensional analysis. One or more convolutional neural networks (CNNs) may recognize letters, symbols, shapes and gestures in SAMs. A selector may select output classifications from among multiple CNNs. A sequence analyzer may select a sequence of selected CNN outputs. Stroke information may comprise, for example, position (e.g. x, y and z), timestamp, velocity (e.g. direction and speed), tilt, rotation, finger positions on a detectable input device, pressure, line width, pen up/down events, hover height, etc. Stroke information may be stored, for example, in bitmap color channels (e.g. to facilitate human review). For example, an x, y velocity vector and x, y tilt may be encoded, respectively, as RGBA components of pixel data. Stroke crossings may be encoded, for example, by combining attribute values at pixels where strokes intersect.

In an example, a method for recognizing what user strokes represent, may comprise, for example receiving, by a computing device, stroke data based on strokes input by a user; generating at least one stroke attribute from the stroke data; encoding the at least one stroke attribute into a matrix, wherein the encoded at least one stroke attribute indicates relative positions of points in the strokes; and providing the matrix as input to at least one machine-learning (ML) classifier to determine what the strokes represent.

In an example, encoding the at least one stroke attribute into a matrix may comprise, for example, encoding a plurality of stroke attributes as a plurality of different colors in the bitmap.

In an example, encoding the plurality of stroke attributes as the plurality of different colors in the bitmap may comprise, for example, encoding an angle as a first color and encoding a magnitude as a second color or encoding a first direction and speed as the first color and encoding a second direction and speed as the second color.

In an example, the at least one stroke attribute may comprise, for example, a direction attribute indicating stroke directions at the points in the strokes.

In an example, the method may further comprise, for example, selecting a classification from a plurality of classifications generated by the plurality of ML classifiers, the selected classification being among a sequence of classifications for a sequence of matrices encoding the stroke data; and determining what the strokes represent based on the sequence of selected classifications.

In an example, the strokes comprise, for example, first and second stroke segments that intersect. Generating the at least one stroke attribute or said encoding the at least one stroke attribute into a matrix may comprise, for example, combining a value of the at least one stroke attribute for the first stroke segment with a value of the at least one stroke attribute for the second stroke segment.

In an example, the method may further comprise, determining what the strokes represent based at least in part on the intersection.

In an example, generating the at least one stroke attribute or encoding the at least one stroke attribute into a matrix may comprise, for example, encoding a temporal discrepancy indicating at least one of (i) when stroking begins and/or ends or (ii) when hovering begins and/or ends.

In an example, a stroke recognition system may comprise, for example, one or more processors; and one or more memory devices that store program code configured to be executed by the one or more processors, the program code comprising: a stroke recognizer configured to: receive stroke data based on strokes input by a user; generate stroke attributes from the stroke data; encode the stroke attributes into matrices, wherein the encoded stroke attributes indicate relative positions of points in the strokes; and providing the matrix as input to machine-learning (ML) classifiers to determine what the strokes represent.

In an example, matrices may comprise bitmaps.

In an example, a stroke recognizer may be configured to encode the stroke attributes as different colors in the bitmaps.

In an example, a stroke recognizer may be configured to (i) encode a first attribute as a first color and encode a second attribute as a second color or (ii) encode a first vector attribute as the first color and encode a second vector attribute as the second color.

In an example, stroke attributes may comprise a direction attribute indicating stroke directions at the points in the strokes.

In an example, the stroke recognizer may be further configured to, for example, generate a set of classifications for each of the matrices; select a classification from the set of classifications for each of the matrices, creating a sequence of classifications; and determine what the strokes represent based on the sequence of classifications.

In an example, the stroke recognizer may be further configured to, for example, combine attribute values for strokes at a point of intersection.

In an example, a computer-readable storage medium may have program instructions recorded thereon that, when executed by a processing circuit, perform a method comprising, for example, receiving stroke data based on strokes input by a user; generating stroke attributes from the stroke data; encoding the stroke attributes into matrices, wherein the encoded stroke attributes indicate relative positions of points in the strokes and wherein the stroke attributes comprise a direction attribute indicating stroke directions at the points in the strokes; and providing the matrix as input to machine-learning (ML) classifiers to determine what the strokes represent.

In an example, the stroke attributes may be encoded as different colors in bitmaps.

In an example, the method (e.g. stored in program instructions on a computer-readable storage medium) may (e.g. further) comprise, for example, generating a set of classifications for each matrix in a sequence of matrices encoded from stroke attributes based on the strokes; selecting a sequence of classifications from the set of classifications for each matrix in the set of matrices; and determining what the strokes represent based on the sequence of selected classifications.

In an example, the method may further comprise, for example, combining attribute values for strokes at a point of intersection.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
    receiving, by a computing device, stroke data based on strokes input by a user;
    generating at least one stroke attribute from the stroke data;
    encoding the at least one stroke attribute into a bitmap, wherein the encoded at least one stroke attribute indicates relative positions of points in the strokes; and
    providing the bitmap as input to at least one machine-learning (ML) classifier to determine what the strokes represent.

2. The method of claim 1, wherein said encoding of the at least one stroke attribute into a bitmap comprises encoding a plurality of stroke attributes as a plurality of different colors in the bitmap.

3. The method of claim 2, wherein said encoding of the plurality of stroke attributes as the plurality of different colors in the bitmap comprises encoding an angle as a first color and encoding a magnitude as a second color or encoding a first direction and speed as the first color and encoding a second direction and speed as the second color.

4. The method of claim 1, wherein the at least one stroke attribute comprises a direction attribute indicating stroke directions at the points in the strokes.

5. The method of claim 1, wherein the at least one ML classifier comprises a plurality of ML classifiers, the method further comprising:
    selecting a classification from a plurality of classifications generated by the plurality of ML classifiers, the selected classification being among a sequence of classifications for a sequence of bitmaps encoding the stroke data; and
    determining what the strokes represent based on the sequence of selected classifications.

6. The method of claim 1, wherein the strokes comprise first and second stroke segments that intersect, wherein said generating the at least one stroke attribute or said encoding the at least one stroke attribute into a bitmap comprises combining a value of the at least one stroke attribute for the first stroke segment with a value of the at least one stroke attribute for the second stroke segment.

7. The method of claim 6, further comprising:
    determining what the strokes represent based at least in part on the intersection.

8. The method of claim 1, wherein said generating the at least one stroke attribute or said encoding the at least one stroke attribute into a bitmap comprises encoding a temporal discrepancy indicating at least one of (i) when stroking begins or ends or (ii) when hovering begins or ends.

9. A system, comprising:
    one or more processors; and
    one or more memory devices that store program code configured to be executed by the one or more processors, the program code comprising:
        a stroke recognizer configured to:
            receive stroke data based on strokes input by a user;
            generate stroke attributes from the stroke data;
            encode the stroke attributes into bitmaps, wherein the encoded stroke attributes indicate relative positions of points in the strokes; and
            provide the bitmaps as input to machine-learning (ML) classifiers to determine what the strokes represent.

10. The system of claim 9, wherein said stroke recognizer is configured to encode the stroke attributes as different colors in the bitmaps.

11. The system of claim 10, wherein said stroke recognizer is configured to (i) encode a first attribute as a first color and encode a second attribute as a second color or (ii) encode a first vector attribute as the first color and encode a second vector attribute as the second color.

12. The system of claim 9, wherein the stroke attributes comprise a direction attribute indicating stroke directions at the points in the strokes.

13. The system of claim 9, said stroke recognizer further configured to:
    generate a set of classifications for each of the bitmaps;
    select a classification from the set of classifications for each of the bitmaps, creating a sequence of classifications; and
    determine what the strokes represent based on the sequence of classifications.

14. The system of claim 9, wherein said stroke recognizer is further configured to:
    combine attribute values for strokes at a point of intersection.

15. A computer-readable storage medium having program instructions recorded thereon that, when executed by a processing circuit, perform a method comprising:
- receiving stroke data based on strokes input by a user;
- generating stroke attributes from the stroke data;
- encoding the stroke attributes into bitmaps, wherein the encoded stroke attributes indicate relative positions of points in the strokes and wherein the stroke attributes comprise a direction attribute indicating stroke directions at the points in the strokes; and
- providing the bitmaps as input to machine-learning (ML) classifiers to determine what the strokes represent.

16. The computer-readable storage medium of claim 15, wherein encoding the stroke attributes into bitmaps comprises:
- encoding the stroke attributes as different colors in the bitmaps.

17. The computer-readable storage medium of claim 15, the method further comprising:
- generating a set of classifications for each bitmap in a sequence of bitmaps encoded from stroke attributes based on the strokes;
- selecting a sequence of classifications from the set of classifications for each bitmap in the set of bitmaps; and
- determining what the strokes represent based on the sequence of selected classifications.

18. The computer-readable storage medium of claim 15, the method further comprising:
- combining attribute values for strokes at a point of intersection.

19. The system of claim 9, wherein the stroke data comprise first and second stroke segments that intersect, wherein said generate stroke attributes or said encode stroke attributes into bitmaps comprises combining a value of a respective stroke attribute for the first stroke segment with a value of a respective stroke attribute for the second stroke segment.

20. The computer-readable storage medium of claim 16, wherein said encoding of the plurality of stroke attributes as different colors in the bitmap comprises:
- encoding an angle as a first color and encoding a magnitude as a second color; or
- encoding a first direction and speed as the first color and encoding a second direction and speed as the second color.

* * * * *